United States Patent
Yurasits et al.

(10) Patent No.: US 11,334,037 B2
(45) Date of Patent: May 17, 2022

(54) SYSTEMS AND METHODS FOR CONTROLLING DEVICES

(71) Applicant: Comcast Cable Communications, LLC, Philadelphia, PA (US)

(72) Inventors: Bryan Yurasits, Levittown, PA (US); David Mays, Palmyra, NJ (US); Jonathan Moore, Philadelphia, PA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 850 days.

(21) Appl. No.: 13/782,071

(22) Filed: Mar. 1, 2013

(65) Prior Publication Data

US 2014/0249657 A1    Sep. 4, 2014

(51) Int. Cl.
*G05B 15/02* (2006.01)
*H04N 21/422* (2011.01)

(52) U.S. Cl.
CPC ....... *G05B 15/02* (2013.01); *H04N 21/42222* (2013.01)

(58) Field of Classification Search
None
See application file for complete search history.

(56) References Cited

U.S. PATENT DOCUMENTS

| | | | |
|---|---|---|---|
| 5,043,646 A | 8/1991 | Smith, III | |
| 5,793,630 A * | 8/1998 | Theimer | G01S 5/16 340/10.42 |
| 6,219,109 B1 | 4/2001 | Raynesford | |
| 8,963,694 B2 * | 2/2015 | Nystrom | H04N 21/4223 340/12.22 |
| 9,071,862 B2 * | 6/2015 | Chen | H04N 21/42206 |
| 2004/0095317 A1 | 5/2004 | Zhang | |
| 2007/0208433 A1 * | 9/2007 | Coffy | H04W 4/001 700/1 |
| 2009/0068925 A1 | 3/2009 | Sheu | |
| 2011/0191516 A1 | 8/2011 | Xiong | |
| 2012/0042343 A1 | 2/2012 | Laligand | |
| 2014/0226851 A1 * | 8/2014 | Alberth, Jr. | G06Q 50/06 382/103 |

OTHER PUBLICATIONS

Hsiao-Han Chen et al. "Direction-based Wireless Remote Controller: A Smartphone Application". Journal of Wireless Mobile Networks, Ubiquitous Computing, and Dependable Applications (JoWUA) vol. 2, No. 2 (Jun. 2011) pp. 33-45.*

* cited by examiner

*Primary Examiner* — Ryan A Jarrett

(74) *Attorney, Agent, or Firm* — Ballard Spahr LLP

(57) ABSTRACT

Systems and methods for managing device controls are disclosed. One method can comprise determining an orientation of a controller and comparing the orientation of the controller and an activation orientation. If the orientation of the controller substantially matches the activation orientation, a control relationship between the controller and the user device may be automatically activated, and if the orientation of the controller does not substantially match the activation orientation, control options to a user of the controller.

20 Claims, 12 Drawing Sheets

SYSTEMS AND METHODS FOR CONTROLLING DEVICES

BACKGROUND

Various devices can be configured to control user devices, such as, televisions, communication terminals, receivers, and the like. Such "control" devices often have a pre-defined number of inputs or buttons, and can be programmed to enable control of various user devices. Encoded data such as command codes or an index of codes for controlling a user device is typically programmed directly on the control device. However, current solutions for managing device controls are cumbersome, confusing, and do not provide sufficient means for controlling multiple user devices using the same control device. These and other shortcomings are addressed by the present disclosure.

SUMMARY

It is to be understood that both the following general description and the following detailed description are exemplary and explanatory only and are not restrictive, as claimed. Provided are methods and systems for managing device controls and control relationships between one or more devices (e.g., content device, user device, computing device) and a controller.

In an aspect, the systems and methods of the present disclosure can utilize an orientation element such as a compass, a location element such as a global positioning system, and/or a device or logic that can support orientation and/or location discovery. As an example, the orientation element can provide orientation information. The orientation information can be compared to known (e.g., registered) orientations or other comparators to automatically identify and/or select a particular user device to control.

In an aspect, when multiple user devices comprise similar registered orientation information, a coordinate such as latitude, longitude, altitude, and the like, can be used to determine particular location. Accordingly, orientation information and the coordinate can be used to automatically identify and/or select a particular user device to control.

In an aspect, the systems and methods of the present disclosure can infer from contextual information which device is to be controlled and can therefore provide a convenient and automated user experience. As a further example, such inference can be based upon one or more of orientation of a controller and/or user device, location of a controller and/or user device, content being rendered by a user device and detected by a controller, proximity of a controller to a particular user device, and a comparison of a state of the controller and a state of the user device. Other inferences can be made based upon other information and contextual data.

In an aspect, provided are methods that can comprise determining a first orientation of a controller and identifying a first user device of the plurality of user devices associated with the first orientation of the controller. Accordingly, a control relationship can be activated between the controller and the first user device. As an example, the controller can have a control relationship established with more than one device. As such, methods can comprise determining a second orientation of the controller and identifying a second user device of the plurality of user devices associated with the second orientation of the controller. Accordingly, a control relationship between the controller and the second user device can be activated.

In an aspect, methods can comprise establishing a control relationship between a controller and the user device, wherein the control relationship comprises an activation orientation. An orientation of the controller can be determined and the orientation of the controller can be compared to the activation orientation. If the orientation of the controller substantially matches the activation orientation, the control relationship between the controller and the user device can be automatically activated. If the orientation of the controller does not substantially match the activation orientation, control options can be presented to a user of the controller.

In an aspect, methods can comprise determining a state of the user device and determining a state of the controller. As an example, the state of the controller and the state of the user device can be compared. Accordingly, a control relationship between the controller and the user device can be activated based upon the comparison of the state of the controller and the state of the user device.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
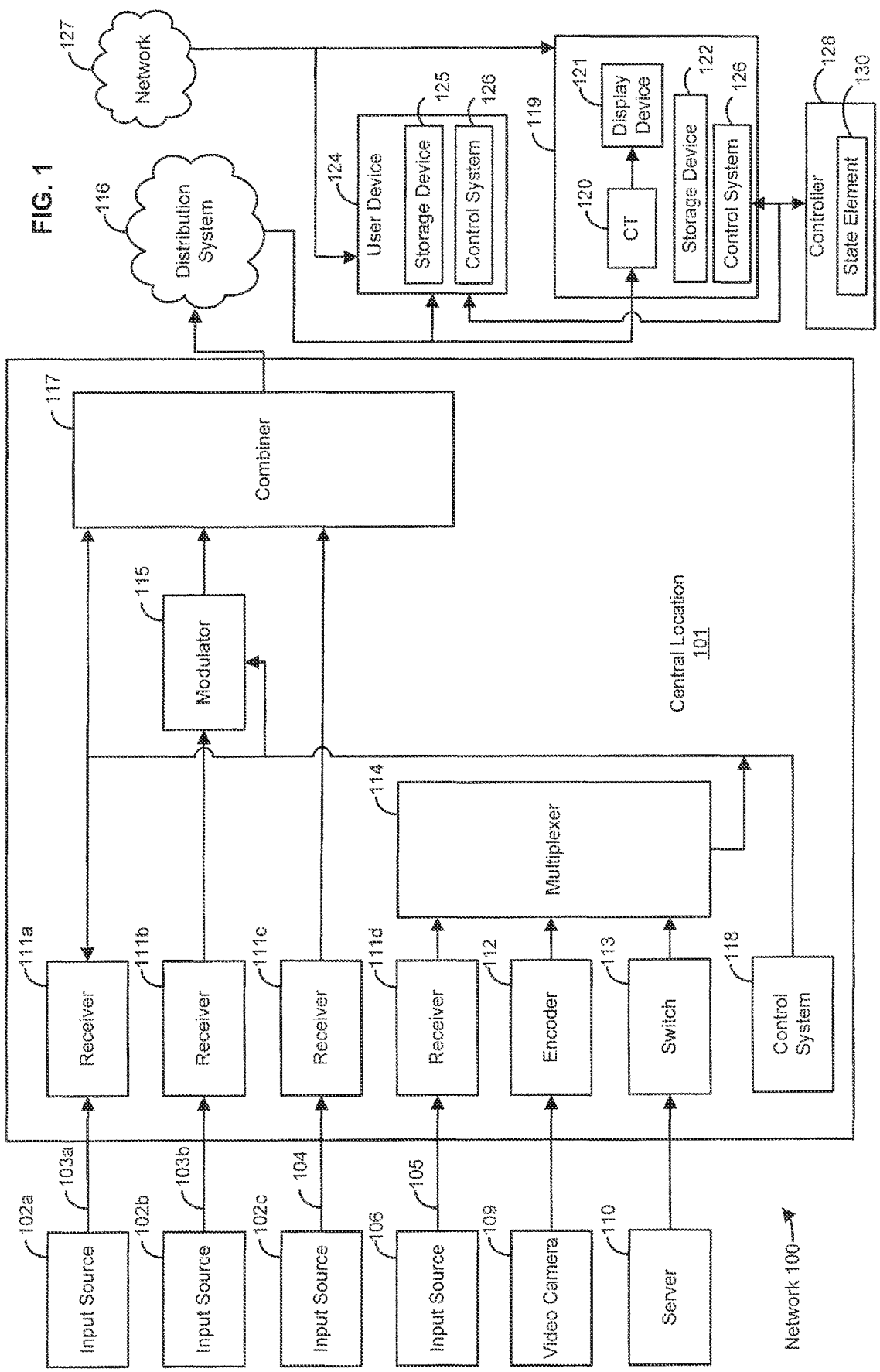
FIG. 1 is a block diagram of an exemplary network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

FIG. 1 illustrates various aspects of an exemplary network in which the present methods and systems can operate. The present disclosure relates to systems and methods for controlling one or more devices. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The network 100 can comprise a central location 101 (e.g., a control or processing facility in a fiber optic network, wireless network or satellite network, a hybrid-fiber coaxial (HFC) content distribution center, a processing center, head-end, etc.), which can receive content (e.g., data, input programming, and the like) from multiple sources. The central location 101 can combine the content from the various sources and can distribute the content to user (e.g., subscriber) locations (e.g., location 119) via distribution system 116.

In an aspect, the central location 101 can create content or receive content from a variety of sources 102a, 102b, 102c. The content can be transmitted from the source to the central location 101 via a variety of transmission paths, including wireless (e.g. satellite paths 103a, 103b) and terrestrial path 104. The central location 101 can also receive content from a direct feed source 106 via a direct line 105. Other input sources can comprise capture devices such as a video camera 109 or a server 110. The signals provided by the content sources can include, for example, a single content item or a multiplex that includes several content items. In an aspect, the central location 101 can create and/or receive application, such as interactive applications. Such applications can be related to a particular content.

The central location 101 can comprise one or a plurality of receivers 111a, 111b, 111c, 111d that are each associated with an input source. For example, MPEG encoders such as encoder 112, are included for encoding local content or a video camera 109 feed. A switch 113 can provide access to server 110, which can be a Pay-Per-View server, a data server, an internet router, a network system, a phone system, and the like. Some signals may require additional processing, such as signal multiplexing, prior to being modulated. Such multiplexing can be performed by multiplexer (mux) 114.

The central location 101 can comprise one or a plurality of modulators 115 for interfacing to the distribution system 116. The modulators can convert the received content into a modulated output signal suitable for transmission over the distribution system 116. The output signals from the modulators can be combined, using equipment such as a combiner 117, for input into the distribution system 116.

A control system 118 can permit a system operator to control and monitor the functions and performance of network 100. The control system 118 can interface, monitor, and/or control a variety of functions, including, but not limited to, the channel lineup for the television system, billing for each user, conditional access for content distributed to users, and the like. Control system 118 can provide input to the modulators for setting operating parameters, such as system specific MPEG table packet organization or conditional access information. The control system 118 can be located at central location 101 or at a remote location.

The distribution system 116 can distribute signals from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. At user location 119, there may be an interface comprising a decoder 120, such as a gateway or communications terminal (CT) can decode, if needed, the signals for display on a display device 121, such as on a television set (TV) or a computer monitor. Various wireless devices may also be connected to the network at, or proximate, user location 119. Those skilled in the art will appreciate that the signal can be decoded in a variety of equipment, including an CT, a computer, a TV, a monitor, or satellite dish. In an exemplary aspect, the methods and systems disclosed can be located within, or performed on, one or more CT's 120, display devices 121, central locations 101, DVR's, home theater PC's, and the like. As an example, a storage device 122 can be in communication with one or more of the CT 120, the display device 121, and the central location 101 to send/receive content there between. As a further example, the storage device 122 can be located remotely from the user location 119, such as a network storage. In an aspect, a software such as an operating software, control software, or application software can be stored on the storage device 122.

In an aspect, user location 119 is not fixed. By way of example, a user can receive content from the distribution system 116 on a mobile device such as a laptop computer, PDA, smartphone, GPS, vehicle entertainment system, portable media player, and the like.

In an aspect, a user device 124 can receive signals from the distribution system 116 for rendering content on the user device 124. As an example, rendering content can comprise providing audio and/or video, displaying images, facilitating an audio or visual feedback, tactile feedback, and the like. However, other content can be rendered via the user device 124. In an aspect, the user device 124 can be an CT, a set-top box, a television, a computer, a smartphone, a laptop, a tablet, a multimedia playback device, a portable electronic device, and the like. As an example, the user device 124 can be an Internet Protocol compatible device for receiving signals via a network 127 such as the Internet or some other communications network for providing content to the user. It is understood that other display devices and networks can be used. It is further understood that the user device 124 can be a widget or a virtual device for displaying content in a picture-in-picture environment such as on the display device 121, for example. As an example, a storage device 125 can be in communication with one or more of the user device 124 and the central location 101 to send/receive content there between. As a further example, the storage device 125 can be located remotely from the user device 124, such as a network storage medium. In an aspect, a software such as operating software, control software, or application software can be stored on the storage device 125.

In an aspect, one or more of the CT 120, the user device 124, or other device or system can be in communication with a control system 126 or device or element. The control system 126 can be disposed remotely from one or more of the CT 120 and/or the user device 124 and in communication with one or more devices. As an example, the control system 126 can comprise control software for managing one or more control functions and/or associated encoding. As a further example, the control system 126 can be integrated with one or more of the CT 120, the user device 124, or other device or system.

In an aspect, the control system 126 can be configured to receive, transmit, and/or process encoding such as control codes, code indices, and/or index codes associated with control functions for one or more devices. As an example, the control system 126 can be configured to communicate with a control device or controller 128 to transmit encoding to the controller 128 to enable the controller to control one or more devices. As a further example, the control system 126 can communicate with the controller 128 to evaluate one or more code indices to determine a best match or preferred encoding relating to the control functions associated with a particular device (e.g., CT 120, display device 121, user device 124).

In an aspect, the controller 128 can be a remote controller configured to communicate with one or more devices via wired and/or wireless communication (e.g., radio frequency, infrared, WiFi, Bluetooth, etc.). As an example, the controller 128 can be software executed by a computing device (e.g., mobile device, handheld device, tablet, computer, second screen device, etc.). As a further example, the controller 128 can be any hardware and/or software configured to communicate with a device to control functions associated with the device.

In an aspect, the controller 128 can comprise a state element 130 (e.g., orientation element) such as a compass, global positioning system, and/or a device or logic that can support orientation discovery. As an example, the state element 130 can provide orientation information. The orientation information can be compared to registered orientations or other comparators to automatically identify and/or select a particular user device to control.

In an aspect, when multiple user devices comprise similar registered orientation information, a coordinate such as latitude, longitude, altitude, and the like, can be used to determine particular location. Accordingly, orientation information and the coordinate can be used to automatically identify and/or select a particular user device to control.

In an aspect, the systems and methods of the present disclosure can infer from contextual information which device is to be controlled and can therefore provide a convenient and automated user experience. As an example, such inference can be based upon one or more of orientation of a controller and/or user device, location of a controller and/or user device, content being rendered by a user device and detected by a controller, proximity of a controller to a particular user device, and a comparison of a state of the controller and a state of the user device. As another example, a directional control device such as a pointing device or a device having orientation state information can be used to "point" to a particular user device to indicate a desire to control the user device. As a further example, a directional control device can be pointed toward a plurality of devices, whereby an activated user device is inferred to be the user device that is desired to be controlled. Other inferences can be made based upon other information and contextual data.

Figure 2:
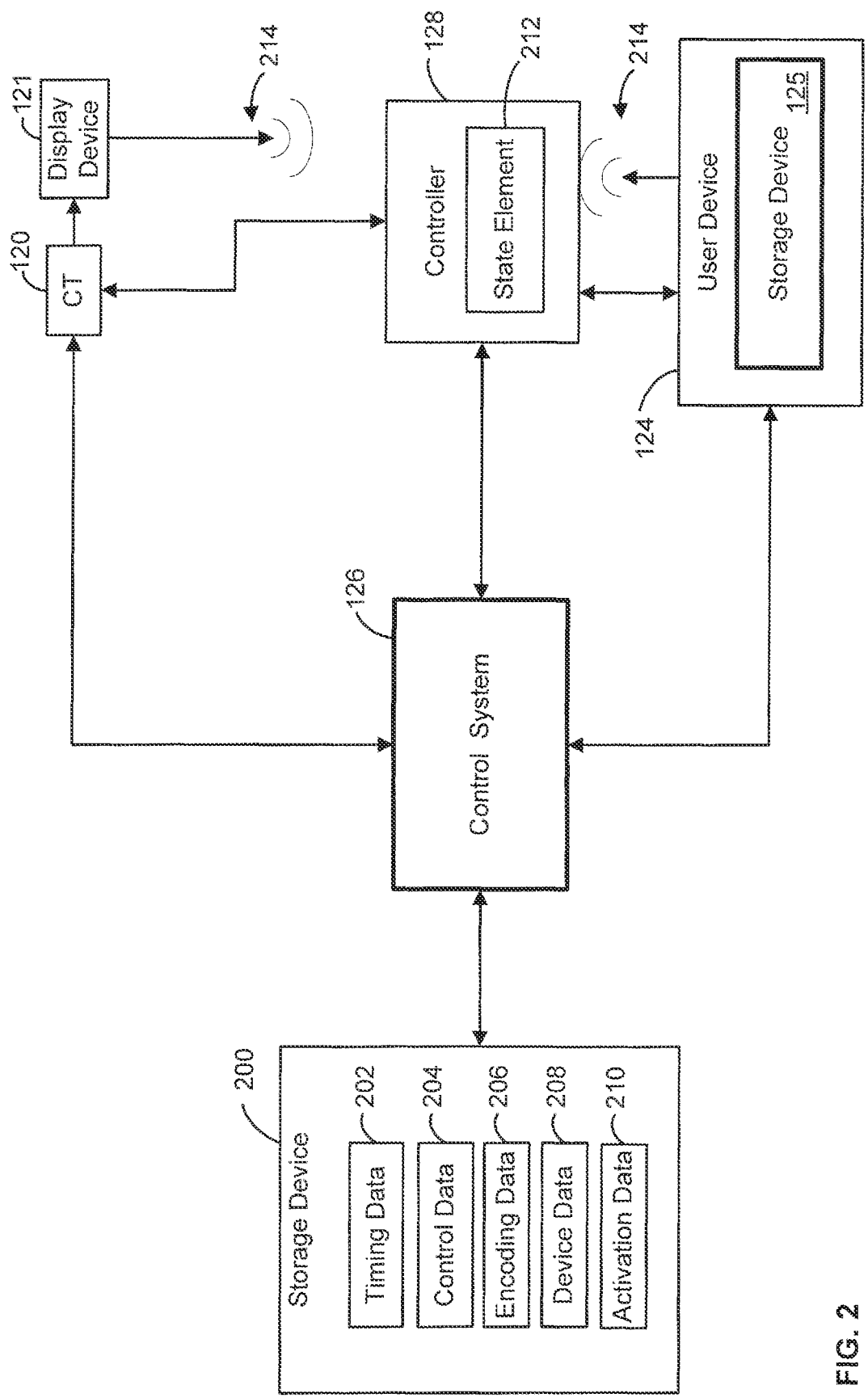
FIG. 2 is a block diagram on an exemplary system and network.

FIG. 2 illustrates various aspects of an exemplary system in which some of the disclosed methods and systems can operate. In an aspect, the control system 126 can be disposed or otherwise implemented remotely from one or more of the CT 120 and/or the user device 124. The system may also be in communication with one or more devices such as the CT 120 and/or the user device 124. As an example, the control system 126 can be disposed in the central location 101. As a further example, the control system 126 can be integrated into a device to manage device control features. In an aspect, the control system 126 can be in communication with the controller 128. As an example, the control system 126 can transmit encoded data (e.g., control codes) or instructions to the controller 128 to enable the controller 128 to interact with and/or control a device. As a further example, once the controller 128 has the means to control a particular device, the controller 128 has established a control relationship with the particular device. In an aspect, the controller 128 can establish a control relationship with one or more devices to facilitate control of the one or more device via the controller 128. As an example, the control relationship can be active or inactive to provide selective control over one or more of a plurality of devices. In another aspect, the controller 128 can comprise a compass, accelerometer, global positioning system, and/or a device or logic that can support orientation discovery. As an example, the controller 128 can be a computing device such as a mobile device, a tablet, or a handheld computer.

In an aspect, the control system 126 can be disposed in a computing device. As an example, the control system 126 can be a stand-alone system, or may be disposed in one of the CT 120, the user device 124, a set-top box, or a content receiver. As a further example, the control system 126 can be configured to communicate (e.g., wired or wirelessly, uni-directionally or bi-directionally, over RF, IR, WiFi, Bluetooth, and/or other protocols or spectrums) with a controller such as controller 128, as illustrated in FIG. 2. As shown in FIG. 2, the controller 128 can communicate with a device such as a user interface device (e.g., display device 121, audio device, video device, home security system, etc.). Accordingly, the control system 126 can transmit one or more control codes to the controller 128, which can be processed to allow the controller 128 to communicate with the user interface device for controlling functions associated with the user interface device. As an example, a user may want to use a single remote controller (e.g., controller 128) to control various user interface devices or system. As such, the control system 126 can transmit the requisite command codes to the remote controller to program the remote controller for controlling functions of the various user interface devices.

In an aspect, the control system 126 can be in communication with a storage device 200 or storage medium. The storage device 200 can be disposed remotely from one or more of the control system 126, the CT 120, the user device 124, and the controller 128. For example, the storage device can be located at central location 101, at a third-party location, and the like. As a further example, the storage device 200 can be integrated or disposed in one or more of the CT 120, the user device 124, and the controller 128. In an aspect, the storage device 200 can be the same storage as storage device 122 or storage device 125. The storage device 200 can be comprised in the control system 126.

In an aspect, the storage device 200 can comprise one or more of timing data 202, control data 204, encoding data 206, device data 208, and/or activation data 210. Other data can be stored on and retrieved from the storage device 200.

In an aspect, the timing data 202 can be a time stamp or other time marker for indicating, for example, a date and/or time associated with one or more of a transmission of content, a request for content, a request for playback, storage of content, deletion of content, a request for encoding, encoded data updates, or the execution of a particular control function. As an example, the timing data 202 can comprise any number of time-related entries and/or markers. As a further example, the timing data 202 can comprise one or more of a table of time-related data entries, a timing log, and a database of time-related information. Other information can be stored as the timing data.

In an aspect, the control data 204 can comprise information relating to characteristics and parameters associated with a particular controller and/or controllable functions of one or more devices. In an aspect, the control data 204 can comprise information relating to the buttons or user interface elements of a particular controller. As an example, when a user configures a tablet or touch screen device to operate as a remote controller, the control data can comprise information relating to the communication protocol(s) associated with the tablet and/or the user interface elements rendered on the tablet. As a further example, the control data 204 can comprise information relating to the association of one or more interface elements and the transmission of control signals via one or more protocols and/or transmission channels.

In an aspect, the encoding data 206 can comprise information relating to the programming code required to execute control over one or more functions of a particular device. As an example, the encoding data 206 can comprise one or more code indices and/or macros (e.g., group of commands) or a reference to a command that is already programmed on a controller or device. As a further example, the encoding data 206 can be classified based on manufacturer, model, series, version, device type, modulation and the like.

In an aspect, the device data 208 can comprise information relating to one or more controllable devices. As an example, the device data 208 can comprise information for one or more devices relating to manufacturer, model, series, version, device type, and the like. As a further example, the device data 208 can be associated with the encoding data 206 such that a particular device having a particular manufacturer may be associated with particular encoding data 206. Accordingly, when a user indicates a desire to control a particular device, the control system 126 can locate the encoding data 206 that enables control over the particular device. In an aspect, the device data 208 can comprise information relating to a state of the controller 128. As an example, the state of the controller 128 can comprise an orientation, location, altitude, relative position, absolute position, and/or proximity to another device or data point. As a further example, the state of the controller 128 can comprise a contextual state such as a listening state, wherein the state of the controller 128 is determined based upon an audio, video, or other signal that is being received by the controller 128. Other parameters or contexts relating to a condition or environment of the controller 128 can be used to determine a state of the controller 128.

In an aspect, the activation data 210 can comprise information relating to one or more control relationships between the controller 128 and one or more devices (e.g., CT 120, user device 124, etc.). In an aspect, activation data 210 can comprise information relating to a state of the controller 128 that is associated with a control relationship between the controller 128 and one or more devices. As an example, the state of the controller 128 at the time a control relationship is established with a particular device can be stored as the activation data 210. Accordingly, when the state of the controller 128 matches the activation data 210, the controller 128 can be automatically configured to enable control of the particular device associated with the activation data 210. In an aspect, the activation data 210 can comprise location information and orientation information associated with a plurality of device. As an example, each location/orientation data entry can be associated with a particular single device. In this way, when the controller 128 is in a particular location and/or has a particular orientation that matches the location/orientation data entry, the controller 128 can be automatically configured to control the device associated or registered with the location/orientation data entry. As a further example, as the location and/or orientation of the controller 128 changes, the automatic selection of devices for control by the controller 128 can be based upon a comparison of the current state of the controller 128 to the activation data 210.

In an aspect, the controller 128 can comprise a state element 212. As an example, the state element 212 can be a physical component, a logical component, software, or the like. As a further example, the state element 212 can comprise an orientation element and can be configured to function as one or more of a compass, a GPS, an altimeter, a gyroscope, an audio device or sensor, a video device or sensor, and/or a component for determining one or more of a position, orientation, or environment of the controller 128. Data generated and/or collected by the state element 212 can be stored locally to the controller 128 or transmitted to remote storage or another device such as the control system 126 or storage device 200. In an aspect, when a control relationship between the controller 128 and a device, such as user device 124, is established, the state of the controller at the time the control relationship is established can be determined by the state element 212 and transmitted to the storage device 200. As an example, the state data can be stored as the device data 208. As another example, the state data determined at the time a control relationship is established can comprise an identifier or indication of an association with a particular device. As a further example, the state data can be stored as an activation data 212. Subsequently, as the state of the controller 128 changes, the automatic selection of a device for control by the controller 128 can be based upon a comparison of the current state of the controller 128 to the activation data 210.

In an aspect, the controller 128 can be configured to communicate with and control one or more device such as the CT 120, the display device 121, and the user device 124. In another aspect, the controller 128 can receive an input signal 214 (e.g., audio code, video code, inaudible audio, etc.). As an example, the input signal 214 can be embedded in broadcast content from one or more of the CT 120, the display device 121, and the user device 124. However, other signals, such as dedicated encoded signals and the like, can be used. As a further example, the input signal 214 can identify content being rendered via the one or more of the CT 120 and the user device 124. Accordingly, a state of the controller 128 can be determined based upon the content, or identification of the content, being received by the controller 128.

In an aspect, a component, such as the state element 212 or audio processor, can analyze the input signal 214 to provide a "fingerprint" of the input signal 214. The fingerprint of the input signal can be represented by the state data provided by the state element 212. As an example, the fingerprint of the input signal 214 can be compared to a digital library (e.g., data on storage device 200) that associates the fingerprint of the input signal 214 with metadata to identify a particular content. In an aspect, state data provided by the state element 212 can comprise a fingerprint or representation of the input signal 214. As such, the state data can be analyzed to determine particular content that is being rendered in the presence of the controller 128. Once the content has been identified, an upstream device (e.g., central location 101) can determine which device is currently rendering the identified content. Accordingly, the controller can be configured to control the device that is rendering the identified content. As an example, when the controller 128 is within listening proximity of a particular device and can receive the input signal 214, the controller 128 can be automatically configured to activate a control relationship with the device rendering the input signal.

Figure 3:
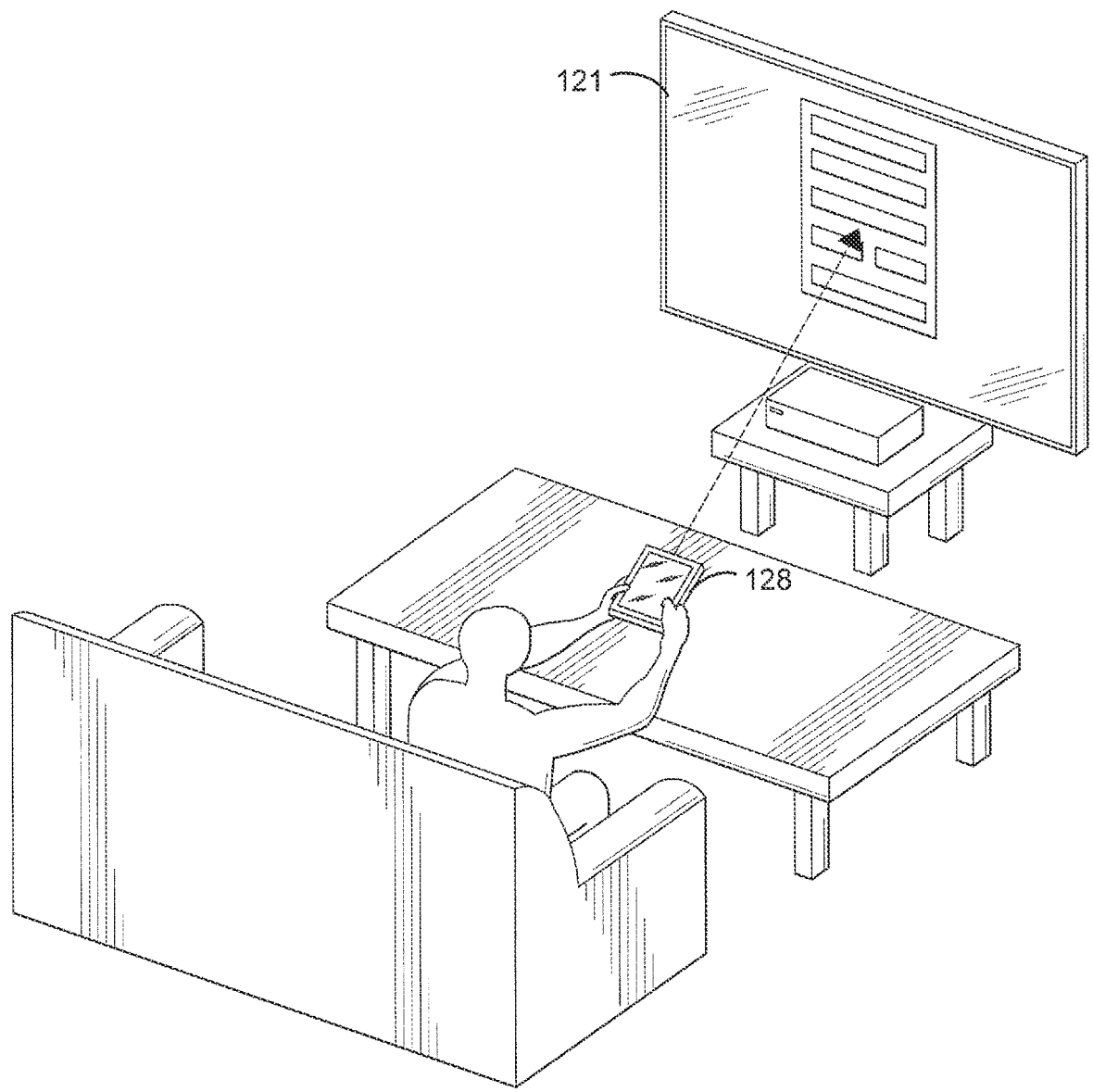
FIG. 3 is a perspective view of an exemplary user environment.

FIG. 3 illustrates an exemplary user environment in which the systems and methods can operate. In an aspect, the controller 128 can be oriented toward a particular device, such as display 121. As such, the state of the controller 128 can relate to the orientation of the controller 128. However, the state of the controller 128 can relate to other parameters. As an example, a state data representing the state of the controller 128 can be compared to a stored state data (e.g., activation data 210). If the current state data of the controller 128 substantially matches the stored state data, the controller 128 can be automatically configured to control a device associated with the stored stated data. As a further example, the current state data of the controller 128 can comprise one or more of a location, position, and/or orientation. As shown in FIG. 3, the current state data of the controller 128 can be matched to a stored state data that is associated with the display 121. Accordingly, the controller can be automatically configured to control the display 121.

Figure 4:
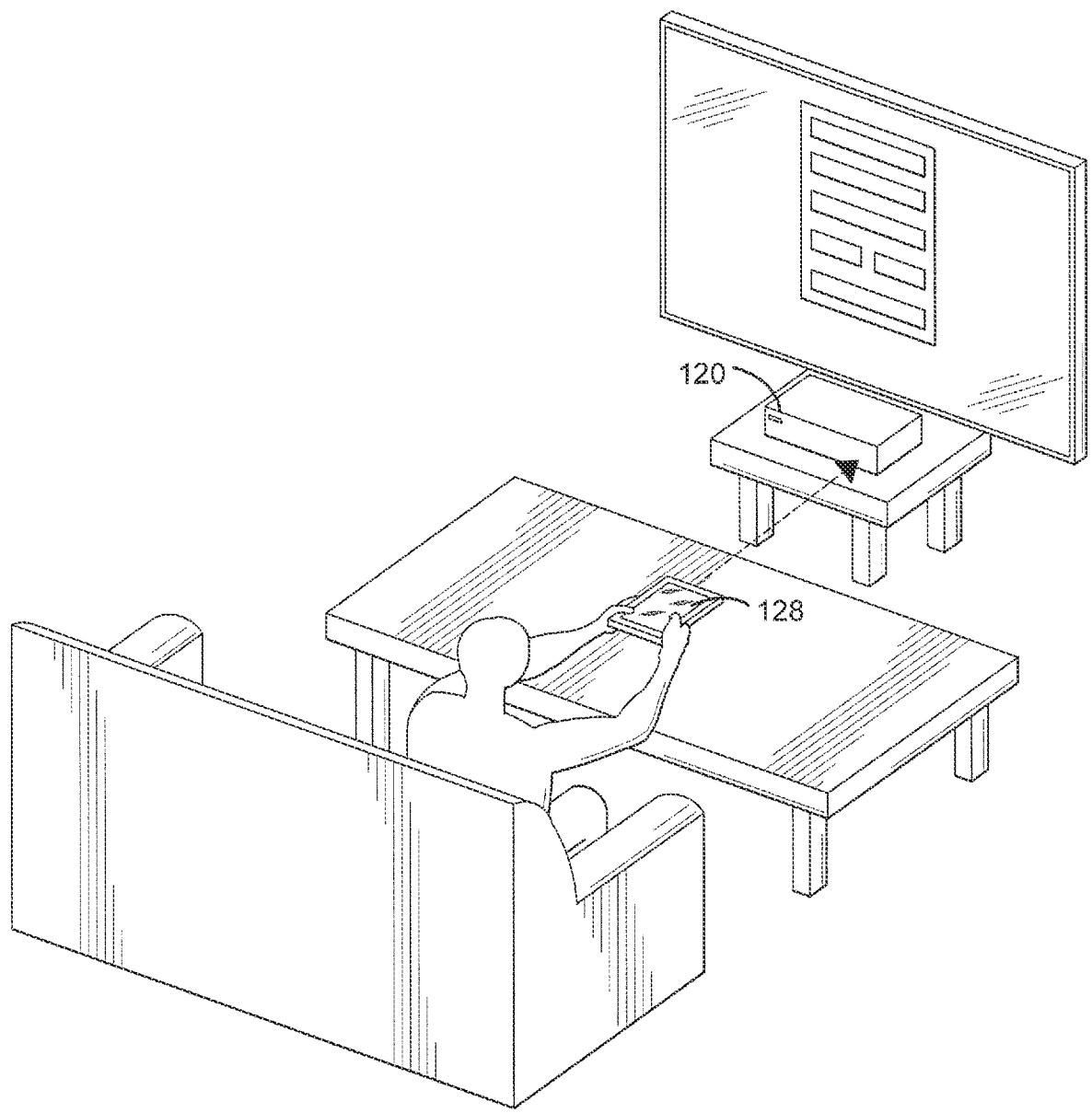
FIG. 4 is a perspective view of an exemplary user environment.

FIG. 4 illustrates an exemplary user environment in which the systems and methods can operate. In an aspect, the controller 128 can be oriented toward a particular device, such as CT 120. As such, the state data of the controller 128 can comprise information relating to the orientation of the controller 128. However, the state data of the controller 128 can comprise other data points and parameters. As an example, the state data of the controller 128 can be compared to a stored state data (e.g., activation data 210). If the current state data of the controller 128 substantially matches the stored state data, the controller 128 can be automatically configured to control a device associated with the stored stated data. As a further example, the current state data of the controller 128 can comprise one or more of a location, position, and/or orientation. As shown in FIG. 4, the current state data of the controller 128 can be matched to a stored state data that is associated with the CT 120. Accordingly, the controller can be automatically configured to control the CT 120.

Figure 5:
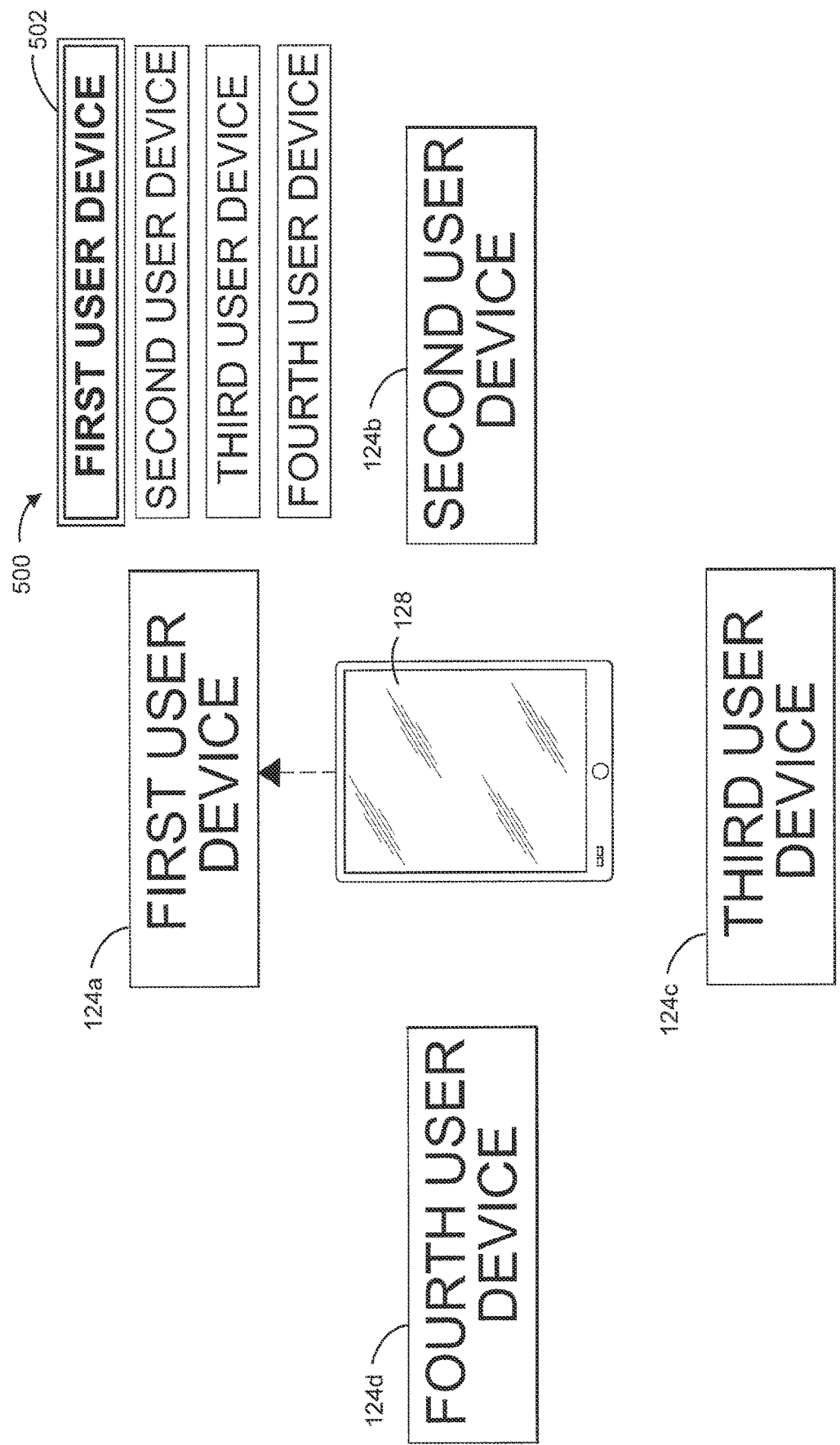
FIG. 5 is a block diagram of an exemplary control environment.

FIG. 5 illustrates a block diagram of an exemplary control environment. In an aspect, the controller 128 can be oriented toward a first user device 124a. As such, the state data of the controller 128 can comprise information relating to the orientation of the controller 128. However, the state data of the controller 128 can comprise other data points and parameters. As an example, the state data of the controller 128 can be compared to stored state data (e.g., activation data 210). If the current state data of the controller 128 substantially matches the stored state data, the controller 128 can be automatically configured to control a device associated with the stored stated data. As a further example, the current state data of the controller 128 can comprise one or more of a location, position, and/or orientation. As shown in FIG. 5, the current state data of the controller 128 can be matched to a stored state data that is associated with the first user device 124a. Accordingly, the controller can be automatically configured to control the first user device 124a.

In an aspect, a user interface 500 can present a representation of one or more potential devices to be controlled by the controller 128. As an example, the one or more potential devices to be controlled can comprise devices associated with particular activation data, devices having an established control relationship with the controller 128, and/or the like. As a further example, the user interface 500 can provide an indication representing a select device 502 of the potential devices. The select device 502 can represent the device for which the controller 128 is currently configured to control. In an aspect, as the state of the controller 128 changes, the select device 502 can change and the controller 128 can be automatically configured to control the select device 502. In an aspect, the user interface 500 can be configured to present a representation of the most likely candidate devices, for example, when the state of the controller 128 is not sufficient to determine a single device for control. As such, a user can navigate the most likely candidate devices and can select a particular device manually.

Figure 6:
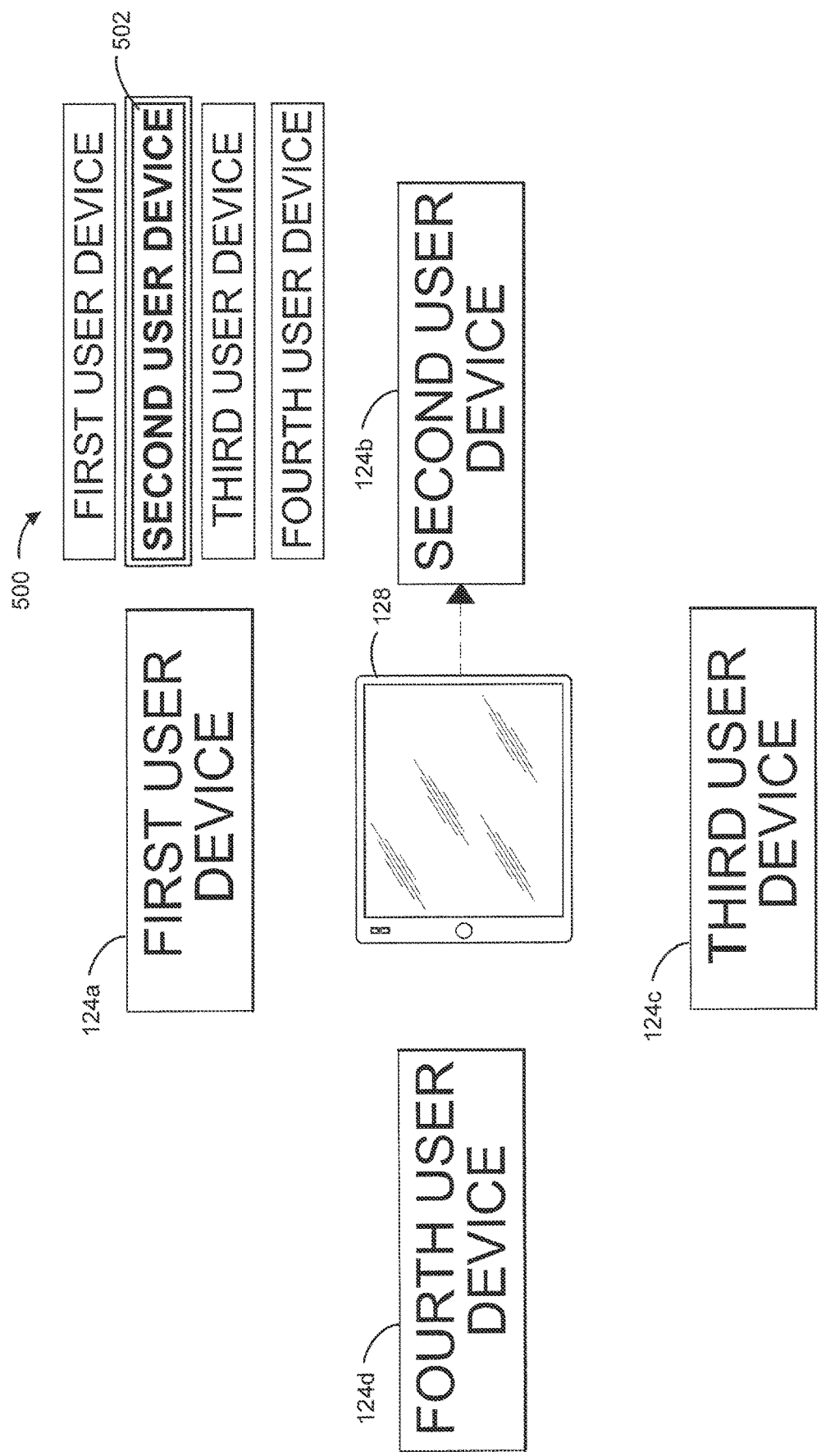
FIG. 6 is a block diagram of an exemplary control environment.

FIG. 6 illustrates a block diagram of an exemplary control environment. In an aspect, the controller 128 can be oriented toward a second user device 124b. As such, the state data of the controller 128 can comprise information relating to the orientation of the controller 128. However, the state data of the controller 128 can comprise other data points and parameters. As an example, the state data of the controller 128 can be compared to stored state data (e.g., activation data 210). If the current state data of the controller 128 substantially matches the stored state data, the controller 128 can be automatically configured to control a device associated with the stored stated data. As a further example, the current state data of the controller 128 can comprise one or more of a location, position, and/or orientation. As shown in FIG. 6, the current state data of the controller 128 can be matched to a stored state data that is associated with the second user device 124b. Accordingly, the controller can be automatically configured to control the second user device 124b. As an example, the user interface 500 can indicate that the second user device 124b is the current select device 502.

Figure 7:
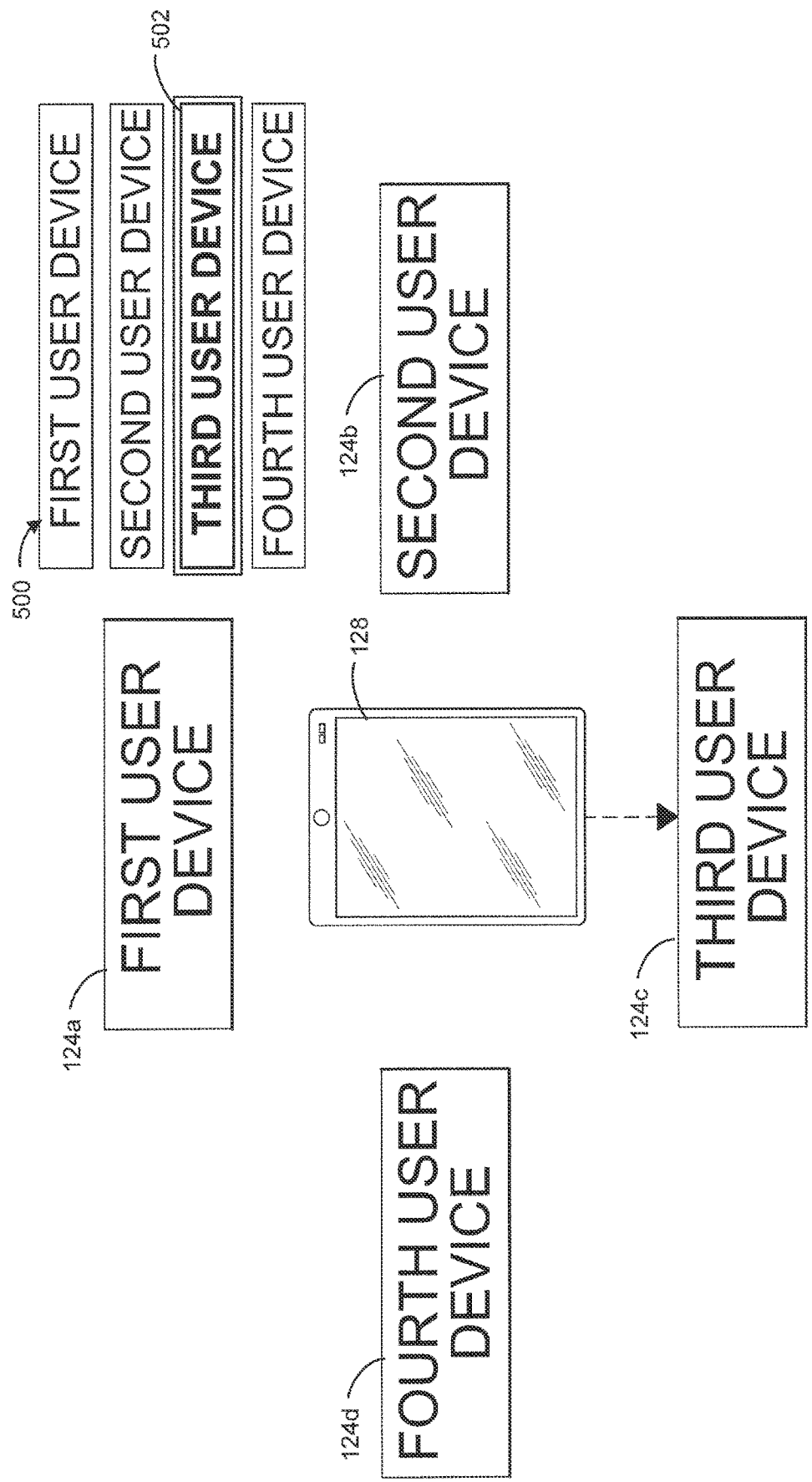
FIG. 7 is a block diagram of an exemplary control environment.

FIG. 7 illustrates a block diagram of an exemplary control environment. In an aspect, the controller 128 can be oriented toward a third user device 124c. As such, the state data of the controller 128 can comprise information relating to the orientation of the controller 128. However, the state data of the controller 128 can comprise other data points and parameters. As an example, the state data of the controller 128 can be compared to stored state data (e.g., activation data 210). If the current state data of the controller 128 substantially matches the stored state data, the controller 128 can be automatically configured to control a device associated with the stored stated data. As a further example, the current state data of the controller 128 can comprise one or more of a location, position, and/or orientation. As shown in FIG. 7, the current state data of the controller 128 can be matched to a stored state data that is associated with the third user device 124c. Accordingly, the controller can be automatically configured to control the third user device 124c. As an example, the user interface 500 can indicate that the third user device 124c is the current select device 502.

Figure 8:
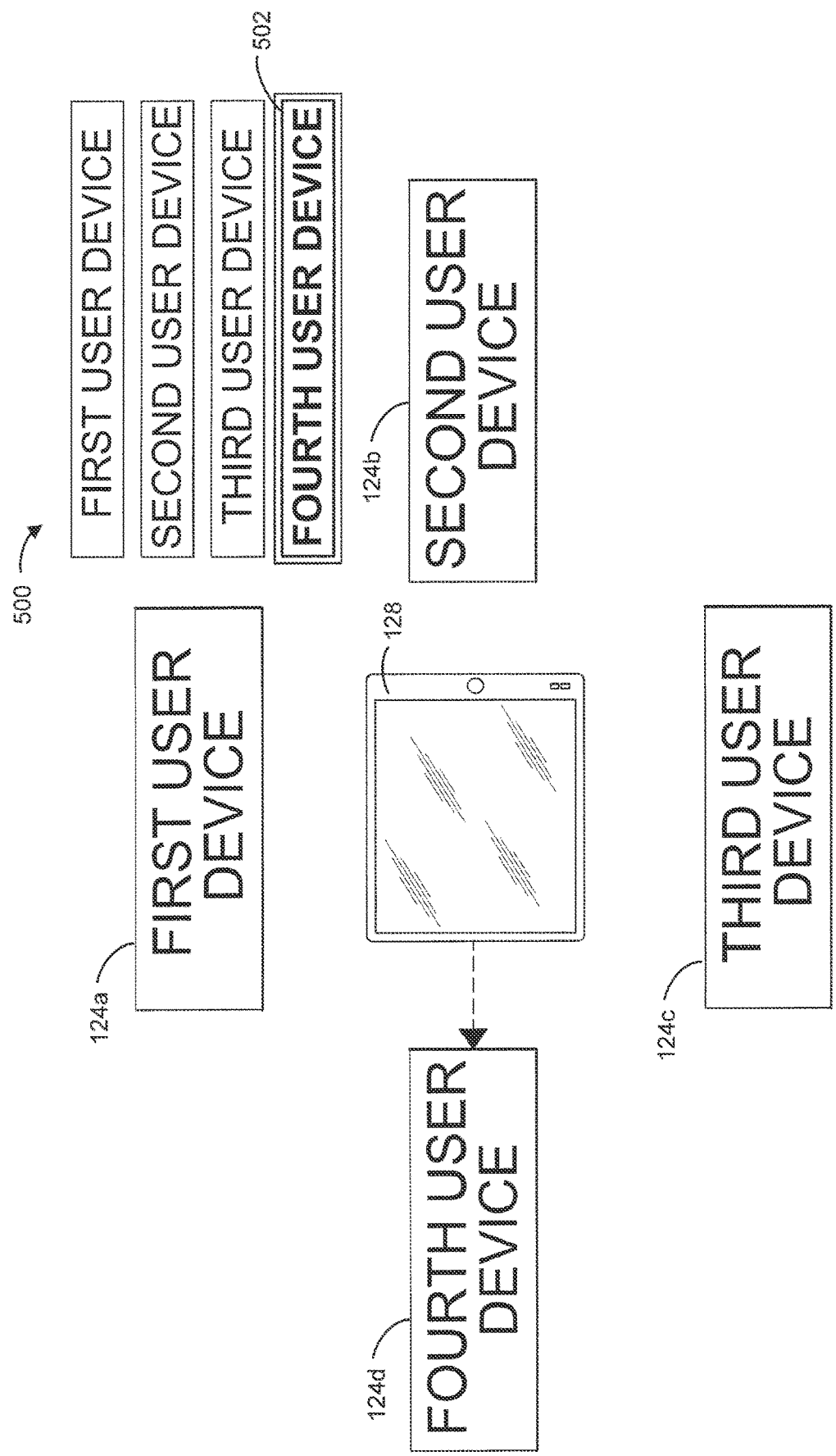
FIG. 8 is a block diagram of an exemplary control environment.

FIG. 8 illustrates a block diagram of an exemplary control environment. In an aspect, the controller 128 can be oriented toward a fourth user device 124d. As such, the state data of the controller 128 can comprise information relating to the orientation of the controller 128. However, the state data of the controller 128 can comprise other data points and parameters. As an example, the state data of the controller 128 can be compared to stored state data (e.g., activation data 210). If the current state data of the controller 128 substantially matches the stored state data, the controller 128 can be automatically configured to control a device associated with the stored stated data. As a further example, the current state data of the controller 128 can comprise one or more of a location, position, and/or orientation. As shown in FIG. 8, the current state data of the controller 128 can be matched to a stored state data that is associated with the fourth user device 124d. Accordingly, the controller can be automatically configured to control the fourth user device 124d. As an example, the user interface 500 can indicate that the fourth user device 124d is the current select device 502.

Figure 9:
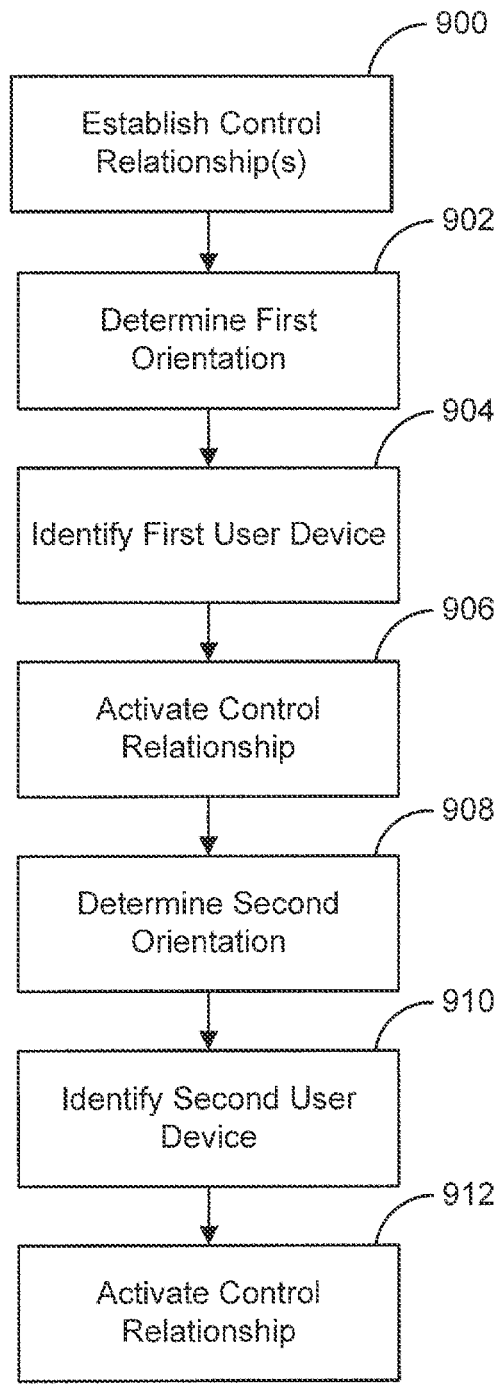
FIG. 9 is a flow chart of an exemplary method.

FIG. 9 illustrates a method for managing control features of a plurality of devices (e.g., CT 120, user device 124, or other devices). In an aspect, in step 900, a control relationship can be established between a controller and one or more user devices. As an example, the control relationship can be an initial setup procedure such as a pairing process. As another example, establishing the control relationship comprises associating a state of the controller (e.g., an activation data) with each of the one or more user devices. As a further example, information relating to the associated state(s) of the controller can be stored and subsequently retrieved to determine which of the one or more user devices should be controlled by the controller.

In step 902, a first state of the controller can be determined. In an aspect, the first state can relate to an orientation. As an example, the first state of the controller can relate to location, altitude, relative position, absolute position, and/or proximity to another device or data point. As a further example, the first state of the controller can relate a contextual state such as a listening state, wherein the first state of the controller is determined based upon an audio, video, or other signal that is being received by the controller. Other parameters or contexts relating to a condition or environment of the controller can be used to determine the first state of the controller. The first state can comprise multiple parameters.

In step 904, a first user device of the plurality of user devices can be identified. In an aspect, data relating to the first state of the controller can be compared to the stored state data to identify the first user device associated with the first state of the controller. As an example, positional information of the controller can be used in conjunction with orientation of the controller to identify a first user device.

In step 906, a control relationship between the controller and the first user device can be activated. In an aspect, activating the control relationship can comprise automatically configuring the controller to facilitate control of the first user device.

In step 908, a second state of the controller can be determined. In an aspect, the second state can relate to an orientation. As an example, the second state of the controller can relate to location, altitude, relative position, absolute position, and/or proximity to another device or data point. As a further example, the second state of the controller can relate to a contextual state such as a listening state, wherein the second state of the controller is determined based upon an audio, video, or other signal that is being received by the controller. Other parameters or contexts relating to a condition or environment of the controller can be used to determine a state of the controller. The second state can comprise multiple parameters.

In step 910, a second user device of the plurality of user devices can be identified. In an aspect, data representing the second state of the controller can be compared to the stored state data to identify the second user device associated with the second state of the controller. As an example, positional information of the controller can be used in conjunction with orientation of the controller to identify a second user device.

In step 912, a control relationship between the controller and the second user device can be activated. In an aspect, activating the control relationship can comprise automatically configuring the controller to facilitate control of the second user device. As an example, an established relationship can be activated to facilitate control of the second device rather than the first device. However, any number of control relationships can be established and or activated.

Figure 10:
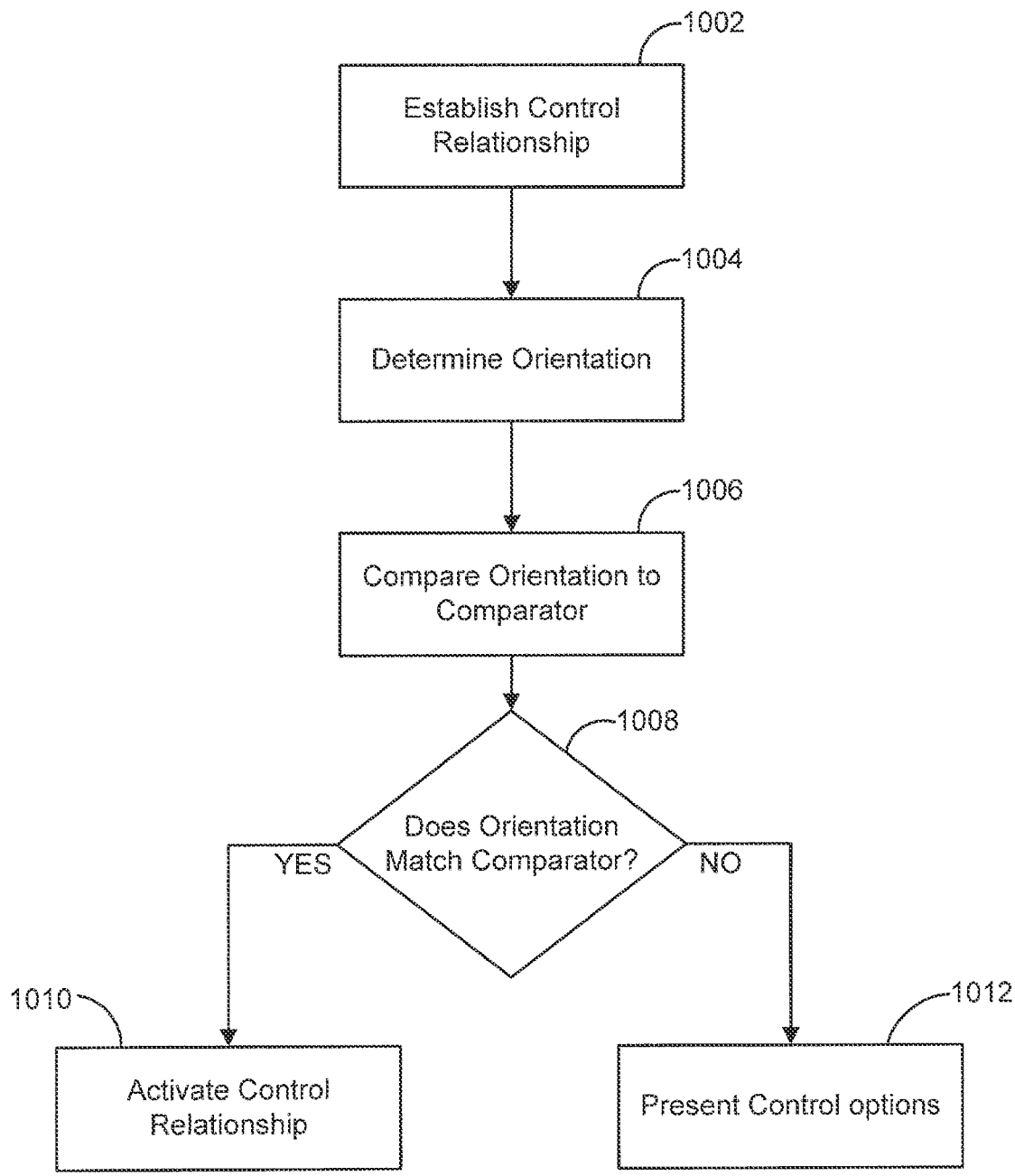
FIG. 10 is a flow chart of an exemplary method.

In an aspect, illustrated in FIG. 10, provided are methods for managing control features of a plurality of devices (e.g., CT 120, user device 124, or other devices). In step 1002, a control relationship between a controller and a user device can be established. As an example, establishing the control relationship comprises associating a state of the controller (e.g., an activation data) with the user device. As a further example, data representing the associated state of the controller can be stored and subsequently retrieved to facilitate control of the user device by the controller. In an aspect, the associated state can comprise an orientation of the controller. For example, when the controller has a particular orientation, data representing the orientation can be associated with a particular user device, thereby establishing a control relationship. As a further example, when the controller is oriented such that the orientation substantially matches the orientation data associated with the particular device, the controller can be automatically configured to control the particular device.

In step 1004, an orientation and/or position (e.g., location, altitude, relative position, etc.) of the controller can be determined. In an aspect, data generated and/or received by a component (e.g., state element 212 (FIG. 2)) of the controller can represent an orientation and/or position of the controller. As an example, the controller can comprise a compass, gyroscope, accelerometer or other directional detecting device configured to determine an orientation of the controller. As a further example, the orientation and or position can be stored as data or transmitted to another device or component.

In step 1006, the determined orientation (e.g., orientation data) and/or position of the controller can be compared to activation data or data representing a particular state of the controller. In an aspect, the determined orientation and/or position can be compared to the activation data associated with the control relationship established in step 1002.

In step 1008, it can be determined whether the orientation (e.g., orientation data) and/or position matches a comparator. In step 1010, if the orientation of the controller substantially matches the activation orientation, the control relationship between the controller and the user device can be activated. As an example, the orientation and other parameters such as position can be matched to activation data in order to activate the control relationship. In an aspect, the control relationship can be automatically activated. As an example, activating the control relationship can comprise facilitating the control of the user device by the controller.

In step 1012, if the orientation of the controller does not substantially match the activation orientation, control options can be presented to a user of the controller. In an aspect, presenting control options to a user of the controller can comprise presenting one or more alternative user devices, wherein the one or more alternative user devices have a control relationship with the controller. As an example, a user can manually select one or more of the alternative user device to facilitate control the select device. As a further example, presenting control options to a user of the controller can comprise presenting an option to establish a control relationship with another user device. Other options can be presented in the user of the controller.

Figure 11:
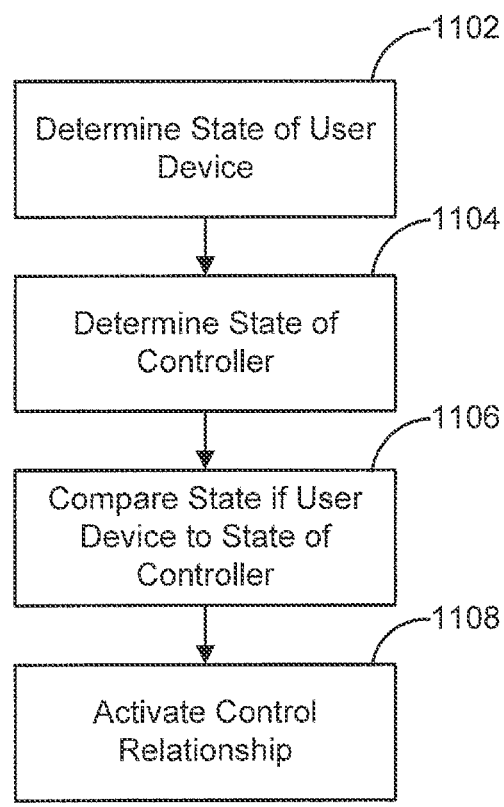
FIG. 11 is a flow chart of an exemplary method.

In an aspect, illustrated in FIG. 11, provided are methods for controlling a device. In step 1102, a state of the user device can be determined. In an aspect, determining the state of the user device can comprise associating activation data with the user device. As an example, determining the state of the user device can comprise receiving activation data associated with the user device. As a further example, determining a state of the user device comprises identifying content presented by the user device.

In step 1104, a state of the controller can be determined. In an aspect, the state of the controller can comprise location, altitude, relative position, absolute position, and/or proximity to another device or data point. As a further example, the state of the controller can comprise a contextual state, such as a listening state, wherein the state of the controller is determined based upon an audio, video, or other signal that is being received by the controller. As another example, determining a state of the controller can comprise receiving content and identifying the content received by the controller. Other parameters or contexts relating to a condition or environment of the controller can be used to determine the state of the controller.

In step 1106, the determined state of the controller and the determined state of the user device can be compared. In an aspect, comparing the state of the controller and the state of the user device can comprise comparing content presented by the user device and content received by the controller. For example, a sample of the content presented by the user device can be compared to content being received by the controller to determine if the controller is within proximity of a particular device. As a further example, one or more user devices can be presenting audio in a given location. The controller can be located within proximity of a particular user device to receive an audio that is presented by the particular user device. The audio received by the controller can be "finger printed" and compared to the audio transmitted by the one or more of the user devices to determine which of the one or more user device is within proximity of the controller.

In step 1108, a control relationship between the controller and the user device can be activated. In an aspect, the control relationship is activated based upon the comparison of the determined state of the controller and the determined state of the user device. As an example, automatically activating the control relationship between the controller and the user device can be executed when the state of the state of the controller substantially matches the state of the user device.

Figure 12:
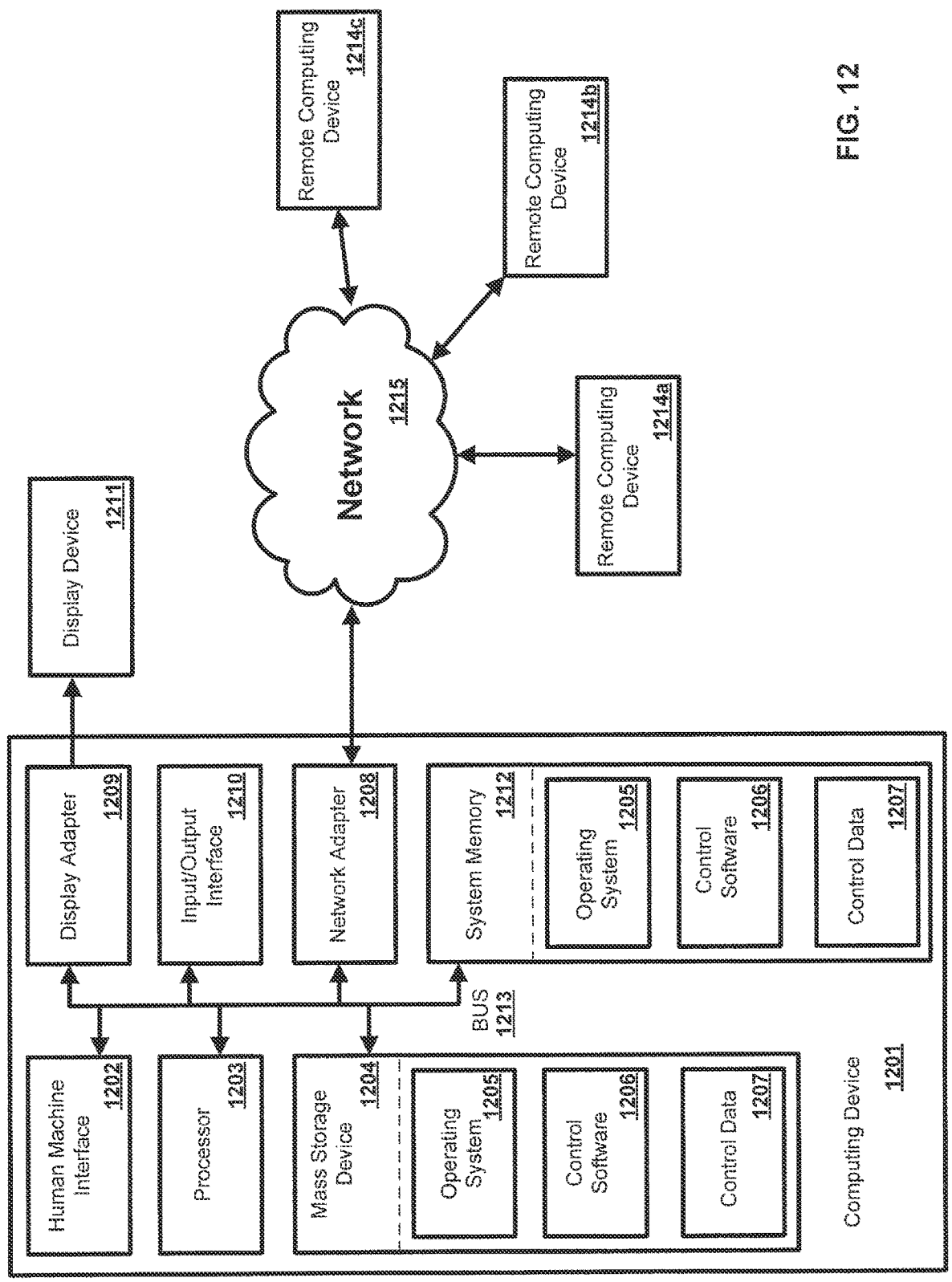
FIG. 12 is a block diagram of an exemplary computing device.

In an exemplary aspect, the methods and systems can be implemented on a computing system such as computing device 1201 as illustrated in FIG. 12 and described below. By way of example, one or more of the CT 120, the user device 124, and the control system 126 of FIGS. 1-2 can comprise a computing device as illustrated in FIG. 12. Similarly, the methods and systems disclosed can utilize one or more computers to perform one or more functions in one or more locations. FIG. 12 is a block diagram illustrating an exemplary operating environment for performing the disclosed methods. One skilled in the art will appreciate that this is a functional description and that the respective functions can be performed by software, hardware, or a combination of software and hardware. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 1201. The components of the computer 1201 can comprise, but are not limited to, one or more processors or processing units 1203, a system memory 1212, and a system bus 1213 that couples various system components including the processor 1203 to the system memory 1212. In the case of multiple processing units 1203, the system can utilize parallel computing.

The system bus 1213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 1213, and all buses specified in this description can also be implemented over a wired or wireless network connection and each of the subsystems, including the processor 1203, a mass storage device 1204, an operating system 1205, control software 1206, control data 1207, a network adapter 1208, system memory 1212, an Input/Output Interface 1210, a display adapter 1209, a display device 1211, and a human machine interface 1202, can be contained within one or more remote computing devices 1214*a,b,c* at physically separate locations, connected through buses of this form, in effect implementing a fully distributed system.

The computing device 1201 typically comprises a variety of computer readable media. Exemplary readable media can be any available media that is accessible by the computing device 1201 and comprises, for example and not meant to be limiting, both volatile and non-volatile media, removable and non-removable media. The system memory 1212 comprises computer readable media in the form of volatile memory, such as random access memory (RAM), and/or non-volatile memory, such as read only memory (ROM). The system memory 1212 typically contains data such as control data 1207 and/or program modules such as operating system 1205 and control software 1206 that are immediately accessible to and/or are presently operated on by the processing unit 1203.

In another aspect, the computing device 1201 can also comprise other removable/non-removable, volatile/non-volatile computer storage media. By way of example, FIG. 12 illustrates a mass storage device 1204 which can provide non-volatile storage of computer code, computer readable instructions, data structures, program modules, and other data for the computing device 1201. For example and not meant to be limiting, a mass storage device 1204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 1204, including by way of example, an operating system 1205 and control software 1206. Each of the operating system 1205 and control software 1206 (or some combination thereof) can comprise elements of the programming and the control software 1206. Control data 1207 can also be stored on the mass storage device 1204. Control data 1207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 1201 via an input device (not shown). Examples of such input devices comprise, but are not limited to, a keyboard, pointing device (e.g., a "mouse"), a microphone, a joystick, a scanner, visual systems such as Microsoft's Kinect, audio systems that process sound such as music or speech, a traditional silver remote control, tactile input devices such as gloves, touch-responsive screen, body coverings, and the like These and other input devices can be connected to the processing unit 1203 via a human machine interface 1202 that is coupled to the system bus 1213, but can be connected by other interface and bus structures, such as a parallel port, game port, an IEEE 1394 Port (also known as a Firewire port), a serial port, or a universal serial bus (USB).

In yet another aspect, a display device 1211 can also be connected to the system bus 1213 via an interface, such as a display adapter 1209. It is contemplated that the computer 1201 can have more than one display adapter 1209 and the computing device 1201 can have more than one display device 1211. For example, a display device can be a monitor, an LCD (Liquid Crystal Display), or a projector. In addition to the display device 1211, other output peripheral devices can comprise components such as speakers (not shown) and a printer (not shown) which can be connected to the computing device 1201 via Input/Output Interface 1210. Any step and/or result of the methods can be output in any form to an output device. Such output can be any form of visual representation, including, but not limited to, textual, graphical, animation, audio, tactile, and the like. The display 1211 and computing device 1201 can be part of one device, or separate devices.

The computing device 1201 can operate in a networked environment using logical connections to one or more remote computing devices 1214a,b,c. By way of example, a remote computing device can be a personal computer, portable computer, a smartphone, a server, a router, a network computer, a peer device or other common network node, and so on. Logical connections between the computing device 1201 and a remote computing device 1214a,b,c can be made via a network 1215, such as a local area network (LAN) and a general wide area network (WAN). Such network connections can be through a network adapter 1208. A network adapter 1208 can be implemented in both wired and wireless environments. Such networking environments are conventional and commonplace in dwellings, offices, enterprise-wide computer networks, intranets, and the Internet. Furthermore, the computing device 1201 can communicate information to one or more of the remote computing devices 1214a,b,c for data analysis, pattern recognition, and control encoding, for example. In an aspect, the control system 126 can communicate information to one or more of the remote computing devices 1214a,b,c (e.g., data center) for one or more of analyzing the alert to determine an appropriate response, aggregating a plurality of received alerts, and filtering a plurality of received alerts.

For purposes of illustration, application programs and other executable program components such as the operating system 1205 are illustrated herein as discrete blocks, although it is recognized that such programs and components reside at various times in different storage components of the computing device 1201, and are executed by the data processor(s) of the computer. An implementation of control software 1206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

In an aspect, systems and methods of the present disclosure can comprise an algorithm or other technique to determine the severity of the event and to notify appropriate personnel to investigate accordingly. As an example, an algorithm can evaluate the event based on severity and can assign a high, medium, or low designation.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
  determining a first direction of orientation of a controller;
  determining, from a first plurality of user devices associated with the first direction of orientation, a first user device based on a location of the controller;
  activating a control relationship between the controller and the first user device by configuring the controller to control the first user device;
  determining a second direction of orientation of the controller;
  presenting, based on the second direction of orientation not satisfying an activation orientation of another user device, control options for a second plurality of user devices; and activating a control relationship between the controller and a user device of the second plurality of user devices by configuring the controller to control the user device of the second plurality of user devices.

2. The method of claim 1, wherein determining the first direction of orientation of the controller comprises receiving information relating to the first direction of orientation from an orientation element.

3. The method of claim 2, wherein the orientation element is integrated with the controller.

4. The method of claim 2, wherein the orientation element comprises one or more of a gyroscope or a compass.

5. The method of claim 1, further comprising determining the first plurality of user devices by matching the determined first direction of orientation to a stored heading associated with the first plurality of user devices.

6. The method of claim 1, wherein the second direction of orientation not satisfying the activation orientation of the another user device comprises determining that the second direction of orientation does not match the activation orientation of the another user device.

7. The method of claim 1, wherein the second plurality of user devices comprises the another user device.

8. An apparatus comprising:
one or more processors; and
a memory comprising processor-executable instructions that, when executed by the one or more processors, cause the apparatus to:
determine a first direction of orientation of a controller;
determine, from a first plurality of user devices associated with the first direction of orientation, a first user device based on a location of the controller;
activate a control relationship between the controller and the first user device by configuring the controller to control the first user device;
determine a second direction of orientation of the controller;
present, based on the second direction of orientation not satisfying an activation orientation of another user device, control options for a second plurality of user devices; and
activate a control relationship between the controller and a user device of the second plurality of user devices by configuring the controller to control the user device of the second plurality of user devices.

9. The apparatus of claim 8, wherein the processor-executable instructions, when executed by the one or more processors, cause the apparatus to determine the first direction of orientation of the controller further cause the apparatus to receive information relating to the first direction of orientation from an orientation element.

10. The apparatus of claim 9, wherein the orientation element is integrated with the controller.

11. The apparatus of claim 9, wherein the orientation element comprises one or more of a gyroscope or a compass.

12. The apparatus of claim 8, wherein the processor-executable instructions, when executed by the one or more processors, further cause the apparatus to determine the first plurality of user devices by matching the determined first direction of orientation to a stored heading associated with the first plurality of user devices.

13. The apparatus of claim 8, wherein the processor-executable instructions, when executed by the one or more processors, further cause the apparatus to determine that the second direction of orientation does not match the activation orientation of the another user device.

14. The apparatus of claim 8, wherein the second plurality of user devices comprises the another user device.

15. A method comprising:
determining a direction of orientation of a controller;
presenting, based on the direction of orientation not satisfying an activation orientation of a user device, control options for a plurality of devices;
receiving, based on presenting the control options, a selection to control a device of the plurality of devices; and
activating a control relationship between the controller and the device of the plurality of devices by configuring the controller to control the device of the plurality of devices.

16. The method of claim 15, wherein determining the direction of orientation of the controller comprises receiving information relating to the direction of orientation from an orientation element.

17. The method of claim 16, wherein the orientation element is integrated with the controller.

18. The method of claim 16, wherein the orientation element comprises one or more of a gyroscope or a compass.

19. The method of claim 15, wherein the direction of orientation not satisfying the activation orientation of the user device comprises determining that the direction of orientation does not match the activation orientation of the user device.

20. The method of claim 15, wherein the plurality of devices comprises the user device.

* * * * *